May 22, 1928.
K. E. LYMAN
1,670,730
BRAKE APPLYING MEANS
Filed June 7, 1927 2 Sheets-Sheet 1
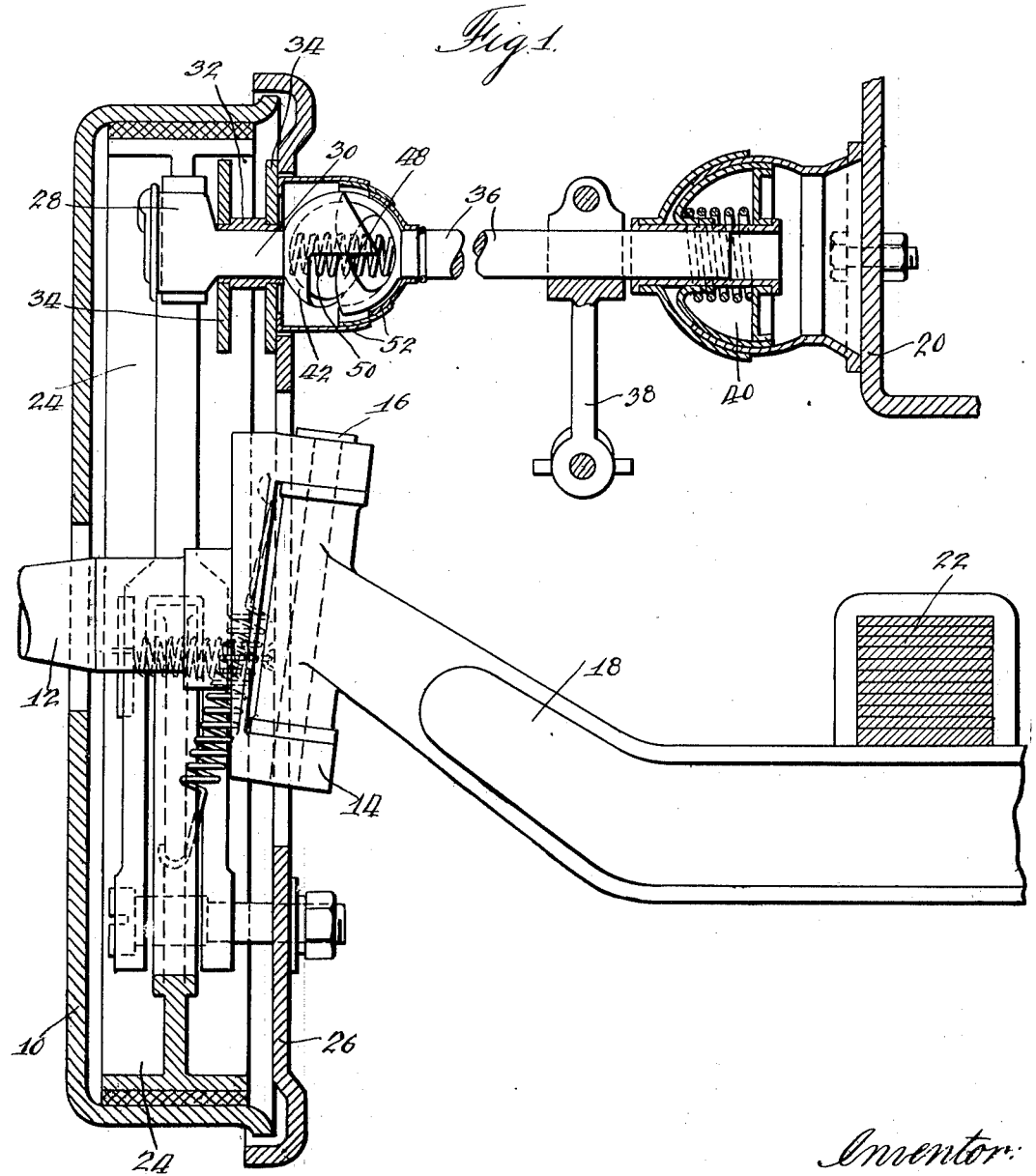
Inventor:
KENNETH E. LYMAN May 22, 1928.
K. E. LYMAN
BRAKE APPLYING MEANS
Filed June 7, 1927
1,670,730
2 Sheets-Sheet 2
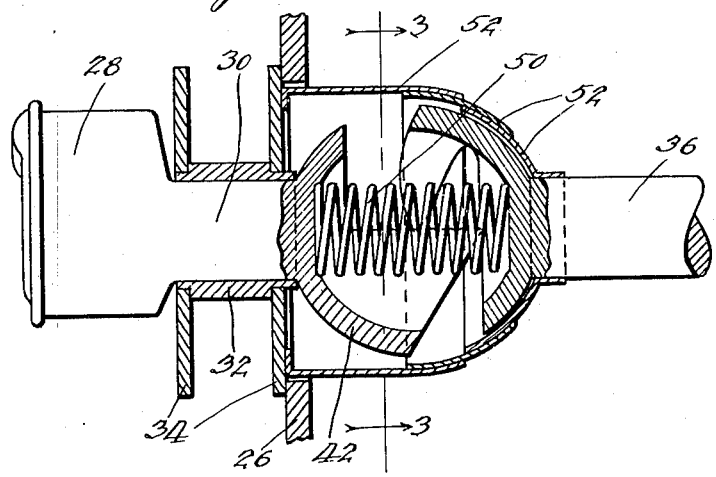
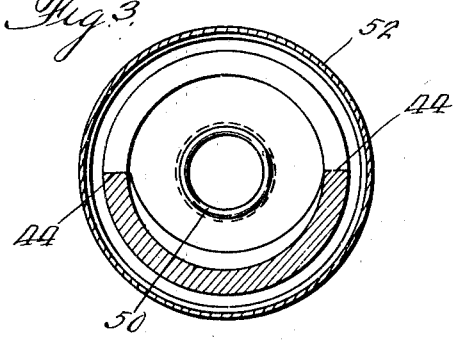
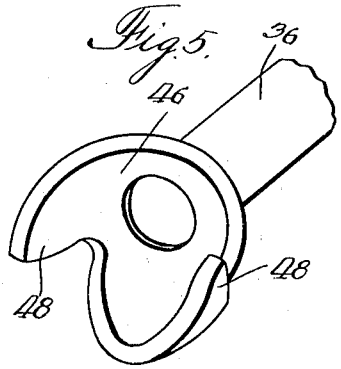
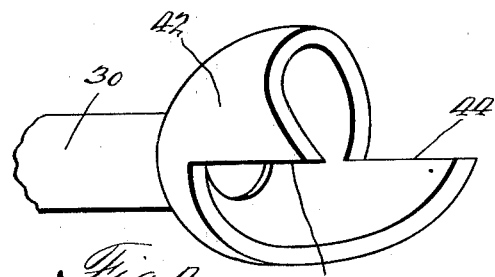
Inventor:
KENNETH E. LYMAN
Witness:
Dave S. Magnusson.
By M. W. McConkey
Atty Patented May 22, 1928.

1,670,730

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

BRAKE-APPLYING MEANS.

Application filed June 7, 1927. Serial No. 197,178.

This invention relates to brakes, and is illustrated as embodied in a front wheel brake for an automobile. An object of the invention is to provide a simple and inexpensive but very strong operating mechanism for the brake, including a novel universal joint substantially at the swivelling axis of the wheel.

In one desirable arrangement, the operating shaft and the camshaft have novel interengaging thrust parts forming the joint, and shown as hemispherical portions having their edges cut away to form the described thrust parts. Preferably the hemispherical portions are urged apart by a spring, axially of the shafts, against an outer housing.

The above and other features of the invention will be apparent from the following description of one illustrative embodiment shown in the accompanying drawing, in which:

Figure 1 is a vertical section through the brake and associated parts, showing the shafts in front elevation;

Figure 2 is a view of part of Figure 1 on a larger scale;

Figure 3 is a section through the joint on the line 3—3 of Figure 2;

Figure 4 is a perspective view of the inner end of the camshaft; and

Figure 5 is a perspective view of the outer end of the operating shaft.

The illustrated brake includes a drum 10, rotating with a wheel (not shown) mounted on the spindle 12 of a knuckle 14, which knuckle is swivelled by a king-pin 16 or the like at one end of an axle 18. Axle 18 supports a chassis frame 20 through the usual springs 22.

The friction means of the brake is illustrated as comprising shoes 24, carried by a backing plate 26 mounted on the knuckle 14, and operated by means such as a cam 28 having a shaft 30. Shaft 30 is journalled in a bushing 32 of graphite bronze or the like, carried by two steel plates 34 secured in any desired manner to the backing plate 26.

The camshaft 30 is operated, through a novel joint above the king-pin 16 in the swivelling axis of the wheel, by an operating shaft 36 having an arm 38 and slidably and universally supported at its inner end by a support 40 carried by the chassis frame 20.

Shaft 30 is formed, or has secured thereto, at its inner end, a hemispherical portion 42 cut away at its edge to form straight thrust surfaces 44 on opposite sides of and paralleling the shaft axis.

Similarly, shaft 36 has at its outer end a hemispherical portion 46, cut away at its edge to form thrust fingers 48 extending circumferentially of the joint and engaging at their ends with the surfaces 44.

Preferably a spring 50 housed within the joint urges the hemispherical portions 42 and 46 apart against a spherical housing formed by stampings 52 carried by the backing plate 26. Housing 52 is preferably in sections which can slide upon each other.

In operation, thrust is transmitted from the projections or fingers 48 to the surfaces 44 to turn the shaft 30. When the shafts move relatively about a horizontal axis, due to the action of springs 22, projections 48 merely roll slightly on surfaces 44. In swivelling the wheel to round a corner, surfaces 44 slide on the projections 48.

While one illustrative embodiment has been described in detail, it is not my intention to limit the scope of the invention to that particular embodiment, or otherwise than by the terms of the appended claims.

I claim:

1. Operating means for a brake on a swivelled wheel comprising a pair of shafts arranged end to end and having a joint substantially at the swivelling axis of the wheel, which joint includes thrust surfaces on one shaft on opposite sides of and paralleling the axis of the shaft, and projecting thrust portions on the other shaft engaging said surfaces.

2. Operating means for a brake on a swivelled wheel comprising a pair of shafts arranged end to end and having a joint substantially at the swivelling axis of the wheel, which joint includes thrust surfaces on one shaft paralleling the axis of the shaft, and projecting thrust portions on the other shaft engaging said surfaces.

3. Operating means for a brake on a swivelled wheel comprising a pair of shafts arranged end to end and having a joint substantially at the swivelling axis of the wheel, which joint includes interengaging thrust portions carried by the shafts and rocking on each other to permit relative movement of the shafts about a horizontal axis and sliding on each other to permit relative movement of the shafts about a vertical axis.

4. Operating means for a brake on a swivelled wheel comprising a pair of shafts arranged end to end and having a joint substantially at the swivelling axis of the wheel, which joint includes interengaging thrust portions carried by the shafts and rocking on each other and also sliding on each other to permit relative movement of the shafts about vertical and horizontal axes.

5. Operating means for a brake on a swivelled wheel comprising a pair of shafts arranged end to end and having a joint substantially at the swivelling axis of the wheel, which joint includes hemispherical parts carried by the two shafts and which have torque-transmitting interengaging portions.

6. Operating means for a brake on a swivelled wheel comprising a pair of shafts arranged end to end and having a joint substantially at the swivelling axis of the wheel, which joint includes hemispherical parts carried by the two shafts and one of which has horizontal torque-transmitting surfaces on opposite sides of and paralleling the shaft axis and the other of which is formed at its edge with circumferentially-projecting thrust fingers engaging said surfaces.

7. Operating means for a brake on a swivelled wheel comprising a pair of shafts arranged end to end and having a joint substantially at the swivelling axis of the wheel, which joint includes hemispherical parts carried by the two shafts and which have torque-transmitting interengaging portions, together with a spring between said parts urging them apart axially of the shafts.

8. Operating means for a brake on a swivelled wheel comprising a pair of shafts arranged end to end and having a joint substantially at the swivelling axis of the wheel, which joint includes hemispherical parts carried by the two shafts and which have torque-transmitting interengaging portions, together with a spring between said parts urging them apart axially of the shafts and a spherical housing against which said parts are urged by the spring.

In testimony whereof, I have hereunto signed my name.

KENNETH E. LYMAN.